(12) United States Patent
Kulkarni

(10) Patent No.: US 9,191,610 B2
(45) Date of Patent: Nov. 17, 2015

(54) SYSTEMS AND METHODS FOR CREATING LOGICAL MEDIA STREAMS FOR MEDIA STORAGE AND PLAYBACK

(75) Inventor: Anant Madhava Kulkarni, Dharwar (IN)

(73) Assignee: Sling Media PVT Ltd., Bangalore, IN (US)

(*) Notice: Subject to any disclaimer, the term of this patent is extended or adjusted under 35 U.S.C. 154(b) by 1225 days.

(21) Appl. No.: 12/323,907

(22) Filed: Nov. 26, 2008

(65) Prior Publication Data

US 2010/0129057 A1    May 27, 2010

(51) Int. Cl.
| H04N 5/92 | (2006.01) |
| H04N 5/765 | (2006.01) |
| G11B 27/034 | (2006.01) |
| G11B 27/32 | (2006.01) |
| H04N 9/82 | (2006.01) |

(52) U.S. Cl.
CPC .............. *H04N 5/765* (2013.01); *G11B 27/034* (2013.01); *G11B 27/322* (2013.01); *H04N 9/8205* (2013.01)

(58) Field of Classification Search
USPC ........................................ 386/241; 707/102
See application file for complete search history.

(56) References Cited

U.S. PATENT DOCUMENTS

| 3,416,043 A | 12/1968 | Jorgensen |
| 4,254,303 A | 3/1981 | Takizawa |
| 5,161,021 A | 11/1992 | Tsai |
| 5,237,648 A | 8/1993 | Mills et al. |
| 5,386,493 A | 1/1995 | Degen et al. |
| 5,434,590 A | 7/1995 | Dinwiddie, Jr. et al. |
| 5,493,638 A | 2/1996 | Hooper et al. |
| 5,602,589 A | 2/1997 | Vishwanath et al. |
| 5,661,516 A | 8/1997 | Carles |
| 5,666,426 A | 9/1997 | Helms |

(Continued)

FOREIGN PATENT DOCUMENTS

| CN | 1464685 | 12/2003 |
| DE | 4407319 A1 | 9/1994 |

(Continued)

OTHER PUBLICATIONS

Lee, M. et al. "Video Frame Rate Control for Non-Guaranteed Network Services with Explicit Rate Feedback," Globecom'00, 2000 IEEE Global Telecommunications conference, San Francisco, CA, Nov. 27-Dec. 1, 2000; [IEEE Global Telecommunications Conference], New York, NY; IEEE, US, vol. 1,Nov. 27, 2000, pp. 293-297, XP001195580; ISBN: 978-0-7803-6452-3, lines 15-20 of sec. II on p. 293, fig. 1.

(Continued)

*Primary Examiner* — Hung Dang
*Assistant Examiner* — Girumsew Wendmagegn
(74) *Attorney, Agent, or Firm* — Ingrassia Fisher & Lorenz, P.C.

(57) ABSTRACT

Systems and methods are described for storing a media stream on a storage medium, wherein the media stream is based upon at least one source file. An index file for the media stream is created, and the at least one source file is processed to create at least one media file that is stored on the storage medium. The index file is updated to reference at least a portion of the at least one media file, and the index file is stored on the storage medium. Such techniques may be useful, for example, in encoding information onto a disk drive, flash drive or other portable media compatible with a place-shifting audio/video player or the like.

20 Claims, 5 Drawing Sheets

(56) References Cited

U.S. PATENT DOCUMENTS

| | | |
|---|---|---|
| 5,682,195 A | 10/1997 | Hendricks et al. |
| 5,706,290 A | 1/1998 | Shaw et al. |
| 5,708,961 A | 1/1998 | Hylton et al. |
| 5,710,605 A | 1/1998 | Nelson |
| 5,722,041 A | 2/1998 | Freadman |
| 5,757,416 A | 5/1998 | Birch et al. |
| 5,774,170 A | 6/1998 | Hite et al. |
| 5,778,077 A | 7/1998 | Davidson |
| 5,794,116 A | 8/1998 | Matsuda et al. |
| 5,822,537 A | 10/1998 | Katseff et al. |
| 5,831,664 A | 11/1998 | Wharton et al. |
| 5,850,482 A | 12/1998 | Meany et al. |
| 5,852,437 A | 12/1998 | Wugofski et al. |
| 5,880,721 A | 3/1999 | Yen |
| 5,898,679 A | 4/1999 | Brederveld et al. |
| 5,909,518 A | 6/1999 | Chui |
| 5,911,582 A | 6/1999 | Redford et al. |
| 5,922,072 A | 7/1999 | Hutchinson et al. |
| 5,936,968 A | 8/1999 | Lyons |
| 5,968,132 A | 10/1999 | Tokunaga et al. |
| 5,987,501 A | 11/1999 | Hamilton et al. |
| 6,002,450 A | 12/1999 | Darbee et al. |
| 6,008,777 A | 12/1999 | Yiu |
| 6,014,694 A | 1/2000 | Aharoni et al. |
| 6,020,880 A | 2/2000 | Naimpally |
| 6,031,940 A | 2/2000 | Chui et al. |
| 6,036,601 A | 3/2000 | Heckel |
| 6,040,829 A | 3/2000 | Croy et al. |
| 6,043,837 A | 3/2000 | Driscoll, Jr. et al. |
| 6,049,671 A | 4/2000 | Slivka et al. |
| 6,075,906 A | 6/2000 | Fenwick et al. |
| 6,088,777 A | 7/2000 | Sorber |
| 6,097,441 A | 8/2000 | Allport |
| 6,104,334 A | 8/2000 | Allport |
| 6,108,041 A | 8/2000 | Faroudja et al. |
| 6,115,420 A | 9/2000 | Wang |
| 6,117,126 A | 9/2000 | Appelbaum et al. |
| 6,141,059 A | 10/2000 | Boyce et al. |
| 6,141,447 A | 10/2000 | Linzer et al. |
| 6,160,544 A | 12/2000 | Hayashi et al. |
| 6,201,536 B1 | 3/2001 | Hendricks et al. |
| 6,212,282 B1 | 4/2001 | Mershon |
| 6,222,885 B1 | 4/2001 | Chaddha et al. |
| 6,223,211 B1 | 4/2001 | Hamilton et al. |
| 6,240,459 B1 | 5/2001 | Roberts et al. |
| 6,240,531 B1 | 5/2001 | Spilo et al. |
| 6,243,596 B1 | 6/2001 | Kikinis |
| 6,256,019 B1 | 7/2001 | Allport |
| 6,263,503 B1 | 7/2001 | Margulis |
| 6,279,029 B1 | 8/2001 | Sampat et al. |
| 6,282,714 B1 | 8/2001 | Ghori et al. |
| 6,286,142 B1 | 9/2001 | Ehreth |
| 6,310,886 B1 | 10/2001 | Barton |
| 6,340,994 B1 | 1/2002 | Margulis et al. |
| 6,353,885 B1 | 3/2002 | Herzi et al. |
| 6,356,945 B1 | 3/2002 | Shaw et al. |
| 6,357,021 B1 | 3/2002 | Kitagawa et al. |
| 6,370,688 B1 | 4/2002 | Hejna, Jr. |
| 6,389,467 B1 | 5/2002 | Eyal |
| 6,434,113 B1 | 8/2002 | Gubbi |
| 6,442,067 B1 | 8/2002 | Chawla et al. |
| 6,456,340 B1 | 9/2002 | Margulis |
| 6,466,623 B1 | 10/2002 | Youn et al. |
| 6,470,378 B1 | 10/2002 | Tracton et al. |
| 6,476,826 B1 | 11/2002 | Plotkin et al. |
| 6,487,319 B1 | 11/2002 | Chai |
| 6,493,874 B2 | 12/2002 | Humpleman |
| 6,496,122 B2 | 12/2002 | Sampsell |
| 6,505,169 B1 | 1/2003 | Bhagavath et al. |
| 6,510,177 B1 | 1/2003 | De Bonet et al. |
| 6,529,506 B1 | 3/2003 | Yamamoto et al. |
| 6,553,147 B2 | 4/2003 | Chai et al. |
| 6,557,031 B1 | 4/2003 | Mimura et al. |
| 6,564,004 B1 | 5/2003 | Kadono |
| 6,567,984 B1 | 5/2003 | Allport |
| 6,584,201 B1 | 6/2003 | Konstantinou et al. |
| 6,584,559 B1 | 6/2003 | Huh et al. |
| 6,597,375 B1 | 7/2003 | Yawitz |
| 6,598,159 B1 | 7/2003 | McAlister et al. |
| 6,600,838 B2 | 7/2003 | Chui |
| 6,609,253 B1 | 8/2003 | Swix et al. |
| 6,611,530 B1 | 8/2003 | Apostolopoulos |
| 6,628,716 B1 | 9/2003 | Tan et al. |
| 6,642,939 B1 | 11/2003 | Vallone et al. |
| 6,647,015 B2 | 11/2003 | Malkemes et al. |
| 6,658,019 B1 | 12/2003 | Chen et al. |
| 6,665,751 B1 | 12/2003 | Chen et al. |
| 6,665,813 B1 | 12/2003 | Forsman et al. |
| 6,697,356 B1 | 2/2004 | Kretschmer et al. |
| 6,701,380 B2 | 3/2004 | Schneider et al. |
| 6,704,678 B2 | 3/2004 | Minke et al. |
| 6,704,847 B1 | 3/2004 | Six et al. |
| 6,708,231 B1 | 3/2004 | Kitagawa |
| 6,718,551 B1 | 4/2004 | Swix et al. |
| 6,754,266 B2 | 6/2004 | Bahl et al. |
| 6,754,439 B1 | 6/2004 | Hensley et al. |
| 6,757,851 B1 | 6/2004 | Park et al. |
| 6,757,906 B1 | 6/2004 | Look et al. |
| 6,766,376 B2 | 7/2004 | Price |
| 6,768,775 B1 | 7/2004 | Wen et al. |
| 6,771,828 B1 | 8/2004 | Malvar |
| 6,774,912 B1 | 8/2004 | Ahmed et al. |
| 6,781,601 B2 | 8/2004 | Cheung |
| 6,785,700 B2 | 8/2004 | Masud et al. |
| 6,795,638 B1 | 9/2004 | Skelley, Jr. |
| 6,798,838 B1 | 9/2004 | Ngo |
| 6,806,909 B1 | 10/2004 | Radha et al. |
| 6,807,308 B2 | 10/2004 | Chui et al. |
| 6,816,194 B2 | 11/2004 | Zhang et al. |
| 6,816,858 B1 | 11/2004 | Coden et al. |
| 6,826,242 B2 | 11/2004 | Ojard et al. |
| 6,834,123 B2 | 12/2004 | Acharya et al. |
| 6,839,079 B2 | 1/2005 | Barlow et al. |
| 6,847,468 B2 | 1/2005 | Ferriere |
| 6,850,571 B2 | 2/2005 | Tardif |
| 6,850,649 B1 | 2/2005 | Malvar |
| 6,868,083 B2 | 3/2005 | Apostolopoulos et al. |
| 6,889,385 B1 | 5/2005 | Rakib et al. |
| 6,892,359 B1 | 5/2005 | Nason et al. |
| 6,898,583 B1 | 5/2005 | Rising, III |
| 6,907,602 B2 | 6/2005 | Tsai et al. |
| 6,927,685 B2 | 8/2005 | Wathen |
| 6,930,661 B2 | 8/2005 | Uchida et al. |
| 6,941,575 B2 | 9/2005 | Allen |
| 6,944,880 B1 | 9/2005 | Allen |
| 6,952,595 B2 | 10/2005 | Ikedo et al. |
| 6,981,050 B1 | 12/2005 | Tobias et al. |
| 7,016,337 B1 | 3/2006 | Wu et al. |
| 7,020,892 B2 | 3/2006 | Levesque et al. |
| 7,032,000 B2 | 4/2006 | Tripp |
| 7,047,305 B1 | 5/2006 | Brooks et al. |
| 7,110,558 B1 | 9/2006 | Elliott |
| 7,124,366 B2 | 10/2006 | Foreman et al. |
| 7,151,575 B1 | 12/2006 | Landry et al. |
| 7,155,734 B1 | 12/2006 | Shimomura et al. |
| 7,155,735 B1 | 12/2006 | Ngo et al. |
| 7,184,433 B1 | 2/2007 | Oz |
| 7,224,323 B2 | 5/2007 | Uchida et al. |
| 7,239,800 B2 | 7/2007 | Bilbrey |
| 7,344,084 B2 | 3/2008 | DaCosta |
| 7,430,686 B1 | 9/2008 | Wang et al. |
| 7,464,396 B2 | 12/2008 | Hejna, Jr. |
| 7,502,733 B2 | 3/2009 | Andrsen et al. |
| 7,505,480 B1 | 3/2009 | Zhang et al. |
| 7,565,681 B2 | 7/2009 | Ngo et al. |
| 2001/0021998 A1 | 9/2001 | Margulis |
| 2002/0004839 A1 | 1/2002 | Wine et al. |
| 2002/0010925 A1 | 1/2002 | Kikinis |
| 2002/0012530 A1 | 1/2002 | Bruls |
| 2002/0031333 A1 | 3/2002 | Mano et al. |
| 2002/0046404 A1 | 4/2002 | Mizutani |
| 2002/0053053 A1 | 5/2002 | Nagai et al. |
| 2002/0080753 A1 | 6/2002 | Lee |
| 2002/0090029 A1 | 7/2002 | Kim |

(56) References Cited

U.S. PATENT DOCUMENTS

| | | |
|---|---|---|
| 2002/0105529 A1 | 8/2002 | Bowser et al. |
| 2002/0112247 A1 | 8/2002 | Horner et al. |
| 2002/0122137 A1 | 9/2002 | Chen et al. |
| 2002/0131497 A1 | 9/2002 | Jang |
| 2002/0138843 A1 | 9/2002 | Samaan et al. |
| 2002/0143973 A1 | 10/2002 | Price |
| 2002/0147634 A1 | 10/2002 | Jacoby et al. |
| 2002/0147687 A1 | 10/2002 | Breiter et al. |
| 2002/0167458 A1 | 11/2002 | Baudisch et al. |
| 2002/0188818 A1 | 12/2002 | Nimura et al. |
| 2002/0191575 A1 | 12/2002 | Kalavade et al. |
| 2003/0001880 A1 | 1/2003 | Holtz et al. |
| 2003/0028873 A1 | 2/2003 | Lemmons |
| 2003/0065915 A1 | 4/2003 | Yu et al. |
| 2003/0093260 A1 | 5/2003 | Dagtas et al. |
| 2003/0095791 A1 | 5/2003 | Barton et al. |
| 2003/0115167 A1 | 6/2003 | Sharif et al. |
| 2003/0159143 A1 | 8/2003 | Chan |
| 2003/0187657 A1 | 10/2003 | Erhart et al. |
| 2003/0192054 A1 | 10/2003 | Birks et al. |
| 2003/0208612 A1 | 11/2003 | Harris et al. |
| 2003/0231621 A1 | 12/2003 | Gubbi et al. |
| 2004/0003406 A1 | 1/2004 | Billmaier |
| 2004/0052216 A1 | 3/2004 | Roh |
| 2004/0068334 A1 | 4/2004 | Tsai et al. |
| 2004/0083301 A1 | 4/2004 | Murase et al. |
| 2004/0100486 A1 | 5/2004 | Flamini et al. |
| 2004/0103340 A1 | 5/2004 | Sundareson et al. |
| 2004/0139047 A1 | 7/2004 | Rechsteiner et al. |
| 2004/0162845 A1 | 8/2004 | Kim et al. |
| 2004/0162903 A1 | 8/2004 | Oh |
| 2004/0172410 A1 | 9/2004 | Shimojima et al. |
| 2004/0205830 A1 | 10/2004 | Kaneko |
| 2004/0212640 A1 | 10/2004 | Mann et al. |
| 2004/0216173 A1 | 10/2004 | Horoszowski et al. |
| 2004/0236844 A1 | 11/2004 | Kocherlakota |
| 2004/0255249 A1 | 12/2004 | Chang et al. |
| 2005/0021398 A1 | 1/2005 | McCleskey et al. |
| 2005/0027821 A1 | 2/2005 | Alexander et al. |
| 2005/0038981 A1 | 2/2005 | Connor et al. |
| 2005/0044058 A1 | 2/2005 | Matthews et al. |
| 2005/0050462 A1 | 3/2005 | Whittle et al. |
| 2005/0053356 A1 | 3/2005 | Mate et al. |
| 2005/0055595 A1 | 3/2005 | Frazer et al. |
| 2005/0060759 A1 | 3/2005 | Rowe et al. |
| 2005/0097542 A1 | 5/2005 | Lee |
| 2005/0114852 A1 | 5/2005 | Chen et al. |
| 2005/0132351 A1 | 6/2005 | Randall et al. |
| 2005/0138560 A1 | 6/2005 | Lee et al. |
| 2005/0198584 A1 | 9/2005 | Matthews et al. |
| 2005/0204046 A1 | 9/2005 | Watanabe |
| 2005/0216851 A1 | 9/2005 | Hull et al. |
| 2005/0227621 A1 | 10/2005 | Katoh |
| 2005/0229118 A1 | 10/2005 | Chiu et al. |
| 2005/0246369 A1 | 11/2005 | Oreizy et al. |
| 2005/0251833 A1 | 11/2005 | Schedivy |
| 2005/0283791 A1 | 12/2005 | McCarthy et al. |
| 2005/0288999 A1 | 12/2005 | Lerner et al. |
| 2006/0011371 A1 | 1/2006 | Fahey |
| 2006/0031381 A1 | 2/2006 | Van Luijt et al. |
| 2006/0050970 A1 | 3/2006 | Gunatilake |
| 2006/0051055 A1 | 3/2006 | Ohkawa |
| 2006/0095401 A1 | 5/2006 | Krikorian et al. |
| 2006/0095471 A1 | 5/2006 | Krikorian et al. |
| 2006/0095472 A1 | 5/2006 | Krikorian et al. |
| 2006/0095942 A1 | 5/2006 | Van Beek |
| 2006/0095943 A1 | 5/2006 | Demircin et al. |
| 2006/0107226 A1 | 5/2006 | Matthews et al. |
| 2006/0117371 A1 | 6/2006 | Margulis |
| 2006/0146174 A1 | 7/2006 | Hagino |
| 2006/0280157 A1 | 12/2006 | Karaoguz et al. |
| 2007/0003224 A1 | 1/2007 | Krikorian et al. |
| 2007/0005783 A1 | 1/2007 | Saint-Hillaire et al. |
| 2007/0022328 A1 | 1/2007 | Tarra et al. |
| 2007/0074115 A1 | 3/2007 | Patten et al. |
| 2007/0076604 A1 | 4/2007 | Litwack |
| 2007/0118873 A1* | 5/2007 | Houh et al. .................. 725/136 |
| 2007/0123185 A1* | 5/2007 | Welk et al. ................. 455/166.2 |
| 2007/0168543 A1 | 7/2007 | Krikorian et al. |
| 2007/0180485 A1 | 8/2007 | Dua |
| 2007/0198532 A1 | 8/2007 | Krikorian et al. |
| 2007/0234213 A1 | 10/2007 | Krikorian et al. |
| 2007/0266446 A1* | 11/2007 | Aaron .............................. 726/30 |
| 2007/0286596 A1 | 12/2007 | Lonn |
| 2008/0019276 A1 | 1/2008 | Takatsuji et al. |
| 2008/0037573 A1 | 2/2008 | Cohen |
| 2008/0059533 A1 | 3/2008 | Krikorian |
| 2008/0134267 A1 | 6/2008 | Moghe et al. |
| 2008/0195744 A1 | 8/2008 | Bowra et al. |
| 2008/0199150 A1 | 8/2008 | Candelore |
| 2008/0294759 A1 | 11/2008 | Biswas et al. |
| 2008/0307456 A1 | 12/2008 | Beetcher et al. |
| 2008/0307462 A1 | 12/2008 | Beetcher et al. |
| 2008/0307463 A1 | 12/2008 | Beetcher et al. |
| 2009/0074380 A1 | 3/2009 | Boston et al. |
| 2009/0094113 A1* | 4/2009 | Berry et al. ...................... 705/14 |
| 2009/0199248 A1 | 8/2009 | Ngo et al. |
| 2009/0271429 A1* | 10/2009 | Sato et al. ..................... 707/102 |
| 2010/0100915 A1 | 4/2010 | Krikorian et al. |

FOREIGN PATENT DOCUMENTS

| | | | |
|---|---|---|---|
| EP | 0838945 | A | 4/1998 |
| EP | 1077407 | A1 | 2/2001 |
| EP | 1443766 | A2 | 8/2004 |
| EP | 1691550 | A | 8/2006 |
| EP | 1830558 | A1 | 9/2007 |
| GB | 2307151 | | 5/1997 |
| JP | 2003046582 | A | 2/2003 |
| JP | 2003114845 | A | 4/2003 |
| JP | 2004015111 | A | 1/2004 |
| KR | 19990082855 | A | 11/1999 |
| KR | 20010211410 | A | 8/2001 |
| WO | 0133839 | A1 | 5/2001 |
| WO | 0147248 | A2 | 6/2001 |
| WO | 0193161 | A1 | 12/2001 |
| WO | 03026232 | A1 | 3/2003 |
| WO | 03052552 | A2 | 6/2003 |
| WO | 03098897 | A | 11/2003 |
| WO | 2004032511 | A1 | 4/2004 |
| WO | 2005050898 | A2 | 6/2005 |
| WO | 2006064454 | A1 | 6/2006 |
| WO | 2006074110 | A | 7/2006 |
| WO | 2007027891 | A2 | 3/2007 |
| WO | WO 2007023623 | A1 * | 3/2007 |
| WO | 2007051156 | A2 | 5/2007 |
| WO | 2007141555 | A2 | 12/2007 |
| WO | 2007149466 | A2 | 12/2007 |
| WO | 2008024723 | A | 2/2008 |

OTHER PUBLICATIONS

European Patent Office, International Searching Authority, "International Search Report and Written Opinion," mailed Jun. 4, 2010 for International Application No. PCT/IN2009/000728, filed Dec. 18, 2009.

USPTO Non-Final Office Action mailed Jun. 23, 2010; U.S. Appl. No. 11/933,969, filed Nov. 1, 2007.

Korean Intellectual Property Office "Official Notice of Preliminary Rejection," issued Jun. 18, 2010; Korean Patent Application No. 10-2008-7021254.

Japan Patent Office "Notice of Grounds for Rejection (Office Action)," mailed May 25, 2010; Patent Application No. 2007-0268269.

Japan Patent Office "Notice of Grounds for Rejection (Office Action)," mailed May 25, 2010; Patent Application No. 2007-527683.

USPTO, Final Office Action, mailed Nov. 6, 2009; U.S. Appl. No. 09/809,868, filed Mar. 15, 2001.

USPTO, Final Office Action mailed Nov. 12, 2009; U.S. Appl. No. 11/620,707, filed Jan. 7, 2007.

USPTO, Non-Final Office Action mailed Nov. 23, 2009; U.S. Appl. No. 11/683,862, filed Mar. 8, 2007.

(56) References Cited

OTHER PUBLICATIONS

USPTO, Non-Final Office Action mailed Oct. 1, 2009; U.S. Appl. No. 11/778,287, filed Jul. 16, 2007.
USPTO Final Office Action mailed Dec. 30, 2009; U.S. Appl. No. 11/147,664, filed Jun. 7, 2005.
European Patent Office, European Search Report, mailed Sep. 28, 2009 for European Application No. EP 06 78 6175.
International Search Report for PCT/US2008/069914 mailed Dec. 19, 2008.
PCT Partial International Search, PCT/US2009/054893, mailed Dec. 23, 2009.
Newton's Telecom Dictionary, 21st ed., Mar. 2005.
Ditze M. et all "Resource Adaptation for Audio-Visual Devices in the UPnP QoS Architecture," Advanced Networking and Applications, 2006; AINA, 2006; 20% H International conference on Vienna, Austria Apr. 18-20, 2006.
Joonbok, Lee et al. "Compressed High Definition Television (HDTV) Over IPv6," Applications and the Internet Workshops, 2006; Saint Workshops, 2006; International Symposium, Phoenix, AZ, USA, Jan. 23-27, 2006.
Lowekamp, B. et al. "A Hierarchy of Network Performance Characteristics for Grid Applications and Services," GGF Network Measurements Working Group, pp. 1-29, May 24, 2004.
Meyer, Derrick "MyReplayTV™ Creates First-Ever Online Portal to Personal TI! Service; Gives Viewers Whole New Way to Interact With Programming," http://web.archive.org/web/20000815052751/http://www.myreplaytv.com/, Aug. 15, 2000.
Sling Media "Sling Media Unveils Top-of-Line Slingbox PRO-HD" [online], Jan. 4, 2008, XP002560049; retrieved from the Internet: URL:www.slingmedia.com/get/pr-slingbox-pro-hd.html; retrieved on Oct. 12, 2009.
Srisuresh, P. et al. "Traditional IP Network Address Translator (Traditional NAT)," Network Working Group, The Internet Society, Jan. 2001.
Lucas, Brian et al. "Systems and Methods for Establishing Connections Between Devices Communicating Over a Network," U.S. Appl. No. 12/426,103, filed Apr. 17, 2009.
Thiyagarajan, Venkatesan et al. "Always-On-Top Media Player Launched From a Web Browser," U.S. Appl. No. 12/617,271, filed Nov. 12, 2009.
Paul, John Michael et al. "Systems and Methods for Delivering Messages Over a Network," U.S. Appl. No. 12/619,192, filed Nov. 16, 2009.
Rao, Padmanabha R. et al. "Methods and Apparatus for Establishing Network Connections Using an Inter-Mediating Device," U.S. Appl. No. 12/642,368, filed Dec. 18, 2009.
Dham, Vikram et al. "Systems and Methods for Establishing Network Connections Using Local Mediation Services," U.S. Appl. No. 12/644,918, filed Dec. 22, 2009.
Paul, John et al. "Systems and Methods for Remotely Controlling Media Server Via a Network," U.S. Appl. No. 12/645,870, filed Dec. 23, 2009.
Bajpal, Parimal et al. "Method and Node for Transmitting Data Over a Communication Network using Negative Ackhowledgement," U.S. Appl. No. 12/404,920, filed Mar. 16, 2009.
Bajpal, Parimal et al. "Method and Note for Employing Network connections Over a Connectinoless Transport Layer Protocol," U.S. Appl. No. 12/405,062, filed Mar. 16, 2009.
Asnis, Ilya et al. "Mediated Network address Translation Traversal" U.S. Appl. No. 12/405,039, filed Mar. 16, 2009.
Conway, Frank et al. "Systems and Methods for Creating Variable Length Clips from a Media Stream," U.S. Appl. No. 12,347,465, filed Dec. 31, 2008.
China State Intellectual Property Office "First Office Action," issued Jan. 8, 2010, for Application No. 200810126554.0.
USPTO Final Office action mailed Jan. 25, 2010; U.S. Appl. No. 11/734,277, filed Apr. 12, 2007.
Australian Government "Office Action," Australian Patent Application No. 2006240518, mailed Nov. 12, 2009.
Jain, Vikal Kumar "Systems and Methods for Coordinating Data Communication Between Two Device," U.S. Appl. No. 12/699,280, filed Feb. 3, 2010.
Gangotri, Arun L. et al. "Systems and Methods and Program Applications for Selectively Restructuring the Placeshiftnig of Copy Protected Digital Media Content," U.S. Appl. No. 12/623,955, filed Nov. 23, 2009.
Paul, John et al. "Systems and Methods for Searching Media Content," U.S. Appl. No. 12/648,024, filed Dec. 28, 2009.
Newton's Telcom Dictionary, 20th ed., Mar. 2004.
"The Authoritative Dictionary of IEEE Standard Terms," 7th ed. 2000.
Gurzhi, Alexander et al. "Systems and Methods for Emulation Network-Enabled Media Components," U.S. Appl. No. 12/711,830, filed Feb. 24, 2010.
European Patent Office, International Searching Authority, "International Search Report," mailed Mar. 30, 2010; International Application PCT/US2009/068468 filed Dec. 27, 2009.
USPTO Final Office Action mailed Mar. 3, 2010; U.S. Appl. No. 11/111,265, filed Apr. 21, 2005.
USPTO Final Office Action mailed Mar. 12, 2010; U.S. Appl. No. 11/620,711, filed Jan. 7, 2007.
USPTO Non-Final Office Action mailed Mar. 19, 2010; U.S. Appl. No. 11/147,664, filed Jun. 7, 2005.
USPTO Non-Final Office Action mailed Mar. 31, 2010; U.S. Appl. No. 11/620,707, filed Jan. 7, 2007.
USPTO Non-Final Office Action mailed Apr. 1, 2010; U.S. Appl. No. 12/237,103, filed Sep. 24, 2008.
Qiong, Liu et al. "Digital Rights Management for Content Distribution," Proceedings of the Australasian Information Security Workshop Conference on ACSW Frontiers 2003, vol. 21, 2003, XP002571073, Adelaide, Australia, ISSN: 1445-1336, ISBN: 1-920682-00-7, sections 2 and 2.1.1.
China State Intellectual Property Office "First Office Action," issued Jul. 31, 2009, for Application No. 200580026825.X.
USPTO, Non-Final Office Action, mailed Aug. 4, 2009; U.S. Appl. No. 11/734,277, filed Apr. 12, 2007.
USPTO, Final Office Action, mailed Jul. 31, 2009; U.S. Appl. No. 11/683,862, filed Mar. 8, 2007.
USPTO, Non-Final Office Action, mailed Aug. 5, 2009; U.S. Appl. No. 11/147,663, filed Jun. 7, 2005.
USPTO, Non-Final Office Action, mailed Sep. 3, 2009; U.S. Appl. No. 11/620,711, filed Jan. 7, 2007.
Einaudi, Andrew E. et al. "Systems and Methods for Selecting Media Content Obtained from Multiple Sources," U.S. Appl. No. 12/543,278, filed Aug. 18, 2009.
Malode, Deepak Ravi "Remote Control and Method for Automatically Adjusting the Volume Output of an Audio Device," U.S. Appl. No. 12/550,145, filed Aug. 28, 2009.
Akella, Aparna Sarma "Systems and Methods for Event Programming Via a Remote Media Player," U.S. Appl. No. 12/537,057, filed Aug. 6, 2009.
Shah, Bhupendra Natwerlan et al. "Systems and Methods for Transcoding and Place Shifting Media Content," U.S. Appl. No. 12/548,130, filed Aug. 26, 2009.
Banger, Shashidhar et al. "Systems and Methods for Automatically Controlling the Resolution of Streaming Video Content," U.S. Appl. No. 12/537,785, filed Aug. 7, 2009.
Panigrahi, Biswaranjan "Home Media Aggregator System and Method," U.S. Appl. No. 12/538,681, filed Aug. 10, 2009.
Nandury, Venkata Kishore "Adaptive Gain Control for Digital Audio Samples in a Media Stream," U.S. Appl. No. 12/507,971, filed Jul. 23, 2009.
Shirali, Amey "Systems and Methods for Providing Programming Content," U.S. Appl. No. 12/538,676, filed Aug. 10, 2009.
Thiyagarajan, Venkatesan "Systems and Methods for Virtual Remote Control of Streamed Media," U.S. Appl. No. 12/538,664, filed Aug. 10, 2009.
Thiyagarajan, Venkatesan et al. "Localization Systems and Method," U.S. Appl. No. 12/538,783, filed Aug. 10, 2009.
Shirali, Amey et al. "Methods and Apparatus for Seeking Within a Media Stream Using Scene Detection," U.S. Appl. No. 12/538,784, filed Aug. 10, 2009.

(56) References Cited

OTHER PUBLICATIONS

Thiyagarajan, Venkatesan "Systems and Methods for Updating Firmware Over a Network," U.S. Appl. No. 12/538,661, filed Aug. 10, 2009.
Iyer, Satish "Methods and Apparatus for Fast Seeking Within a Media Stream Buffer," U.S. Appl. No. 12/538,659, filed Aug. 10, 2009.
European Patent Office, International Searching Authority, "International Search Report," for International Application No. PCT/US2009/049006, mailed Sep. 11, 2009.
European Patent Office, European Search Report for European Application No. EP 08 16 7880, mailed Mar. 4, 2009.
Mythtv Wiki, "MythTV User Manual" [Online], Aug. 27, 2007, XP002515046; retrieved from the Internet: <URL: http://www.mythtv.org/wiki?title=User_Manual:Introduction&oldid=25549>.
International Searching Authority, Written Opinion and International Search Report for International Application No. PCT/US2008/077733, mailed Mar. 18, 2009.
International Searching Authority, Written Opinion and International Search Report for International Application No. PCT/US2008/087005, mailed Mar. 20, 2009.
Watanabe Y. et al., "Multimedia Database System for TV Newscasts and Newspapers"; Lecture Notes in Computer Science, Springer Verlag, Berlin, Germany; vol. 1554, Nov. 1, 1998, pp. 208-220, XP002402824, ISSN: 0302-9743.
Yasuhiko Watanabe et al., "Aligning Articles in TV Newscasts and Newspapers"; Proceedings of the International Conference on Computationallinguistics, XX, XX, Jan. 1, 1998, pp. 1381-1387, XP002402825.
Sodergard C. et al., "Integrated Multimedia Publishing: Combining TV and Newspaper Content on Personal Channels"; Computer Networks, Elsevier Science Publishers B.V., Amsterdam, Netherlands; vol. 31, No. 11-16, May 17, 1999, pp. 1111-1128, XP004304543, ISSN: 1389-1286.
Ariki Y. et al., "Automatic Classification of TV News Articles Based on Telop Character Recognition"; Multimedia Computing and Systems, 1999; IEEE International Conference on Florence, Italy, Jun. 7-11, 1999, Los Alamitos, California, USA, IEEE Comput. Soc. US; vol. 2, Jun. 7, 1999, pp. 148-152, XP010519373, ISBN: 978-0-7695-0253-3; abstract, paragraph [03.1], paragraph [05.2], figures 1,2.
USPTO, Non-Final Office Action mailed Dec. 17, 2004; U.S. Appl. No. 09/809,868, filed Mar. 15, 2001.
USPTO, Final Office Action mailed Jul. 28, 2005; U.S. Appl. No. 09/809,868, filed Mar. 15, 2001.
USPTO, Non-Final Office Action mailed Jan. 30, 2006; U.S. Appl. No. 09/809,868, filed Mar. 15, 2001.
USPTO, Final Office Action mailed Aug. 10, 2006; U.S. Appl. No. 09/809,868, filed Mar. 15, 2001.
USPTO, Non-Final Office Action mailed Jun. 19, 2007; U.S. Appl. No. 09/809,868, filed Mar. 15, 2001.
USPTO, Non-Final Office Action mailed Apr. 16, 2008; U.S. Appl. No. 091809,868, filed Mar. 15, 2001.
USPTO, Final Office Action mailed Sep. 18, 2008; U.S. Appl. No. 09/809,868, filed Mar. 15, 2001.
USPTO, Non-Final Office Action mailed Mar. 31, 2009; U.S. Appl. No. 09/809,868, filed Mar. 15, 2001.
USPTO, Non-Final Office Action mailed May 1, 2008; U.S. Appl. No. 11/111,265, filed Apr. 21, 2005.
USPTO, Final Office Action mailed Dec. 29, 2008; U.S. Appl. No. 11/111,265, filed Apr. 21, 2005.
USPTO, Non-Final Office Action mailed Jun. 8, 2009; U.S. Appl. No. 11/111,265, filed Apr. 21, 2005.
USPTO, Non-Final Office Action mailed Jun. 26, 2008; U.S. Appl. No. 11/620,707, filed Jan. 7, 2007.
USPTO, Final Office Action mailed Oct. 21, 2008; U.S. Appl. No. 11/620,707, filed Jan. 7, 2007.
USPTO, Non-Final Office Action mailed Mar. 25, 2009; U.S. Appl. No. 11/620,707, filed Jan. 7, 2007.
USPTO, Non-Final Office Action mailed Aug. 7, 2008; U.S. Appl. No. 11/620,711, filed Jan. 7, 2007.
USPTO, Final Office Action mailed Feb. 9, 2009; U.S. Appl. No. 11/620,711, filed Jan. 7, 2007.
USPTO, Non-Final Office Action mailed Feb. 25, 2009; U.S. Appl. No. 11/683,862, filed Mar. 8, 2007.
USPTO, Non-Final Office Action mailed Dec. 24, 2008; U.S. Appl. No. 11/147,985, filed Jun. 7, 2005.
USPTO, Non-Final Office Action mailed Jun. 25, 2008; U.S. Appl. No. 11/428,254, filed Jun. 30, 2006.
USPTO, Final Office Action mailed Feb. 6, 2009; U.S. Appl. No. 11/428,254, filed Jun. 30, 2006.
USPTO, Non-Final Office Action mailed May 15, 2009; U.S. Appl. No. 111147,664, filed Jun. 7, 2005.
Sonic Blue "ReplayTV 5000 User's Guide," 2002, entire document.
Bluetooth-News; Main Future User Models Document Verification & Qualification: Bluetooth Technical Background, Apr. 21, 1999; pp. 1 of 7 and 2 of 7; http://www.bluetooth.com/v2/news/show.asp 1-2.
Microsoft Corporation; Harman/Kardon "Master Your Universe" 1999.
Matsushita Electric Corporation of America MicroCast : Wireless PC Multimedia Transceiver System, Nov. 1998.
"Wireless Local Area Networks: Issues in Technology and Standards" Jan. 6, 1999.
USPTO, Final Office Action mailed Jun. 25, 2009; U.S. Appl. No. 11/147,985, filed Jun. 7, 2005.
Krikorian, Jason, U.S. Appl. No. 11/734,277, filed Apr. 12, 2007.
Tarra, Raghuveer et al., U.S. Appl. No. 60/975,239, filed Sep. 26, 2007.
Williams, George Edward, U.S. Appl. No. 12/167,041, filed Jul. 2, 2008.
Rao, Padmanabha R., U.S. Appl. No. 12/166,039, filed Jul. 1, 2008.
International Search Report and Written Opinion, PCT/US2005/020105, Feb. 15, 2007, 6 pages.
International Search Report and Written Opinion for PCT/US2006/04382, mailed Apr. 27, 2007.
Archive of "TV Brick Home Server," www.tvbrick.com, [online] [Archived by http://archive.org on Jun. 3, 2004; Retrieved on Apr. 12, 2006] retrieved from the Internet <URL:http://web.archive.org/web/20041107111024/www.tvbrick.com/en/affiliate/tvbs/tvbrick/document18/print>.
Faucon, B. "TV 'Brick' Opens up Copyright Can of Worms," Financial Review, Jul. 1, 2003, [online [Retrieved on Apr. 12, 2006] Retrieved from the Internet, URL:http://afr.com/cgi-bin/newtextversions.pl?storyid+1056825330084&3ate+2003/07/01 &pagetype+printer§ion+1053801318705&path+articles/2003/06/30/0156825330084.html.].
Balster, Eric J., "Video Compression and Rate Control Methods Based on the Wavelet Transform," The Ohio State University 2004, pp. 1-24.
Kulapala et al., "Comparison of Traffic and Quality Characteristics of Rate-Controlled Wavelet and DCT Video," Arizona State University, Oct. 11, 2004.
Skodras et al., "JPEG2000: The Upcoming Still Image Compression Standard," May 11, 2000, 14 pages.
Taubman et al., "Embedded Block Coding in JPEG2000," Feb. 23, 2001, pp. 1-8 of 36.
Kessler, Gary C., An Overview of TCP/IP Protocols and the Internet; Jan. 16, 2007, retrieved from the Internet on Jun. 12, 2008 at http://www.garykessler.net/library/tcpip.html; originally submitted to the InterNIC and posted on their Gopher site on Aug. 5, 1994.
Roe, Kevin, "Third-Party Observation Under EPC Article 115 on the Patentability of an Invention," Dec. 21, 2007.
Roe, Kevin, Third-Party Submission for Published Application Under CFR §1.99, Mar. 26, 2008.
China State Intellectual Property Office "Office Action" issued Mar. 18, 2010 for Application No. 200680022520.6.
China State Intellectual Property Office "Office Action" issued Apr. 13, 2010 for Application No. 200580026825.X.
Canadian Intellectual Property Office "Office Action" mailed Feb. 18, 2010 for Application No. 2569610.
European Patent Office "European Search Report," mailed May 7, 2010 for Application No. 06786174.0.

(56) References Cited

OTHER PUBLICATIONS

Margulis, Neal "Apparatus and Method for Effectively Implementing a Wireless Television System," U.S. Appl. No. 12/758,193, filed Apr. 12, 2010.
Margulis, Neal "Apparatus and Method for Effectively Implementing a Wireless Television System," U.S. Appl. No. 12/758,194, filed Apr. 12, 2010.
Margulis, Neal "Apparatus and Method for Effectively Implementing a Wireless Television System," U.S. Appl. No. 12/758,196, filed Apr. 12, 2010.
Kirkorian, Jason Gary et al. "Personal Media Broadcasting System with Output Buffer," U.S. Appl. No. 12/757,697, filed Apr. 9, 2010.
Tarra, Raghuveer et al. "Firmware Update for Consumer Electronic Device," U.S. Appl. No. 12/757,714, filed Apr. 9, 2010.
Bajpai, Parimal et al. "Systems and Methods of Controlling the Encoding of a Media Stream," U.S. Appl. No. 12/339,878, filed Dec. 19, 2008.
Malone, Edward D. et al. "Systems and Methods for Controlling Media Devices," U.S. Appl. No. 12/256,344, filed Oct. 22, 2008.
Banger, Shashidhar et al. "Systems and Methods for Determining Attributes of Media Items Accessed Via a Personal Media Broadcaster," U.S. Appl. No. 12/334,959, filed Dec. 15, 2008.
Rao, Padmanabha R. "Systems and Methods for Linking Media Content," U.S. Appl. No. 12/359,784, filed Jan. 26, 2009.
Krikorian, Blake Gary et al. "Systems and Methods for Projecting Images From a Computer System," U.S. Appl. No. 12/408,460, filed Mar. 20, 2009.
Krikorian, Blake Gary et al. "Systems and Methods for Presenting Media Content Obtained From Multiple Sources," U.S. Appl. No. 12/408,456, filed Mar. 20, 2009.
International Search Report and Written Opinion for International Application No. PCT/US2008/080910, mailed Feb. 16, 2009.
International Search Report and Written Opinion for International Application No. PCT/US2006/025911, mailed Jan. 3, 2007.
International Search Report for International Application No. PCT/US2007/063599, mailed Dec. 12, 2007.
International Search Report for International Application No. PCT/US2007/076337, mailed Oct. 20, 2008.
International Search Report and Written Opinion for International Application No. PCT/US2006/025912, mailed Jul. 17, 2008.
International Search Report for International Application No. PCT/US2008/059613, mailed Jul. 21, 2008.
Sony Corporation "LocationFree Player Pak—LocationFree Base Station—LocationFree Player" [Online] 2005, XP002512401; retrieved from the Internet: <URL:http://www.docs.sony.com/release/LFPK1.pdf>; retrieved on Jan. 28, 2009.
Wikipedia "Slingbox" [Online], Oct. 21, 2007, XP002512399; retrieved from the Internet: <URL:http://en.wikipedia.org/w/index.php?title=Slingbox&oldid=166080570>; retrieved on Jan. 28, 2009.
Capable Networks LLC "Keyspan Remote Control—Controlling Your Computer With a Remote" [Online], Feb. 21, 2006, XP002512495; retrieved from the Internet: <URL:http://www.slingcommunity.com/article/11791/Keyspan-Remote-Control---Controlling-Your-Computer-With-a-Remote/?highlight=remote+control>; retrieved on Jan. 28, 2009.
Wikipedia "LocationFree Player" [Online], Sep. 22, 2007, XP002512400; retrieved from the Internet: <URL: http://en.wikipedia.org/w/index.php?title=LocationFree_Player&oldid=159683564>; retrieved on Jan. 28, 2009.
Sling Media Inc. "Slingbox User Guide" [Online] 2006, XP002512553; retrieved from the Internet: <URL:http://www.slingmedia.hk/attach/en-US_Slingbox_User_Guide_v1.2.pdf>; retrieved on Jan. 29, 2009.
Sony Corporation "LocationFree TV" [Online], 2004, SP002512410; retrieved from the Internet: <URL:http://www.docs.sony.com/release/LFX1_X5revision.pdf>; retrieved on Jan. 28, 2009 [note—document uploaded in two parts as file exceeds the 25MB size limit].

\* cited by examiner

SYSTEMS AND METHODS FOR CREATING LOGICAL MEDIA STREAMS FOR MEDIA STORAGE AND PLAYBACK

TECHNICAL FIELD

The following discussion generally relates to storing files on a disk or other storage medium. Such files may represent, for example, media files for playback on a television or other display.

BACKGROUND

Historically, consumers generally viewed television programming as it was received live from a broadcast, cable or satellite source. As analog and digital recording devices (e.g., video cassette recorders, as well as digital/personal video recorders) became more prevalent, consumers have been increasingly able to shift their television viewing to more convenient viewing times. Even more recently, the ability to "place shift" television viewing from one location to another has become more widespread. Using the various SLINGBOX products available from Sling Media of Foster City, Calif., for example, consumers are able remotely view television programming or other video signals that are provided by a receiver, media player, recorder or other media source that is physically located at a different place than the viewer. Traditionally, content has been placeshifted primarily from a receiver or recorder over a digital network to a personal computer, wireless phone or other portable device. Viewing placeshifted content on a remotely-located television, however, has traditionally been relatively difficult because most televisions do not have network connectivity or other mechanisms for communicating with remotely-located media sources.

In addition, consumers are showing increased interest in viewing and placeshifting digital content that is produced or received from a digital camera, network server and/or the like. Such content might include consumer-generated content (e.g., home movies or digital clips created by the consumer), as well as any content that has been ripped from a physical media (e.g., a compact disk (CD), digital versatile disk (DVD), and/or the like), or obtained from any free or fee-based online source. Such content may include movies on demand, video clips obtained from an online clipping or file sharing service, or any other content as appropriate. Much of this content is in digital format that is traditionally decoded and viewed on a personal computer or the like. While it would frequently be desirable to view stored digital content on a conventional television, in practice this can be a challenge. Among other issues to be overcome, user-generated or user-stored content files are frequently relatively large in size (e.g., several gigabytes or more), making payback difficult on many devices (such as televisions) that may not have disk-based or other suitable file systems able to accommodate such files.

As a result, it is desirable to create systems, methods and/or devices that are able to present stored media content on a conventional television or similar display. These and other desirable features and characteristics will become apparent from the subsequent detailed description and the appended claims, taken in conjunction with the accompanying drawings and this background section.

BRIEF DESCRIPTION

According to various exemplary embodiments, systems and methods are described for storing a media stream on a storage medium, wherein the media stream is based upon at least one source file. An index file for the media stream is created, and the at least one source file is processed to create at least one media file that is stored on the storage medium. The index file is updated to reference at least a portion of the at least one media file, and the index file is stored on the storage medium. Such techniques may be useful, for example, in encoding information onto a disk drive, flash drive or other portable media compatible with a placeshifting audio/video player or the like.

In other embodiments, a method for playing a media stream stored on a storage medium for a viewer is provided. A metadata file describing the media stream is obtained from the storage media. The metadata file is processed to obtain at least one media file referenced by the metadata file from the storage media, wherein the at least one media file contains at least a portion of the media stream. At least a portion of the at least one media file is rendered to thereby present the at least a portion of the media stream for the viewer.

In still other embodiments, a system is provided for presenting a media stream stored on a storage medium to a viewer on a display. The system comprises a first interface to the storage medium, a second interface to the display, and a processor. The processor is configured to obtain a metadata file from the storage medium, to process the metadata to retrieve a plurality of media blocks identified by the metadata file from the storage medium, and to sequentially render each of the plurality of media blocks to thereby present the media stream to the viewer on the display.

Various other embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and FIG. 1 is a diagram of an exemplary placeshifting and media catching system.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

According to various embodiments, a logical media stream is provided that allows for media files (and the like) to be stored in manageable sizes on a disk or other storage medium. The files making up the logical media stream are indexed using metadata contained in a file or the like that allows the content to be assembled and played back in any desired order to re-create the media stream. Moreover, by storing the media stream in smaller logical components that can be re-assembled, various additional features can be provided, including skipping of unwanted data, inserting custom content into the media stream, and/or allowing progressive playback of multiple segments so that entire large files need not be loaded, downloaded or otherwise obtained. One or more of these and other features may be implemented in various embodiments.

By using a disk filing system with a manageable file size, a media catcher device is able to process content that is stored locally on a hard disk, flash drive or other digital storage device. Such a media catcher device could be used in any number of settings. It could be used, for example, to view content that is physically stored in another room, at a remotely-located home or office, or indeed anywhere that the storage medium could be transported or shipped.

Figure 1:
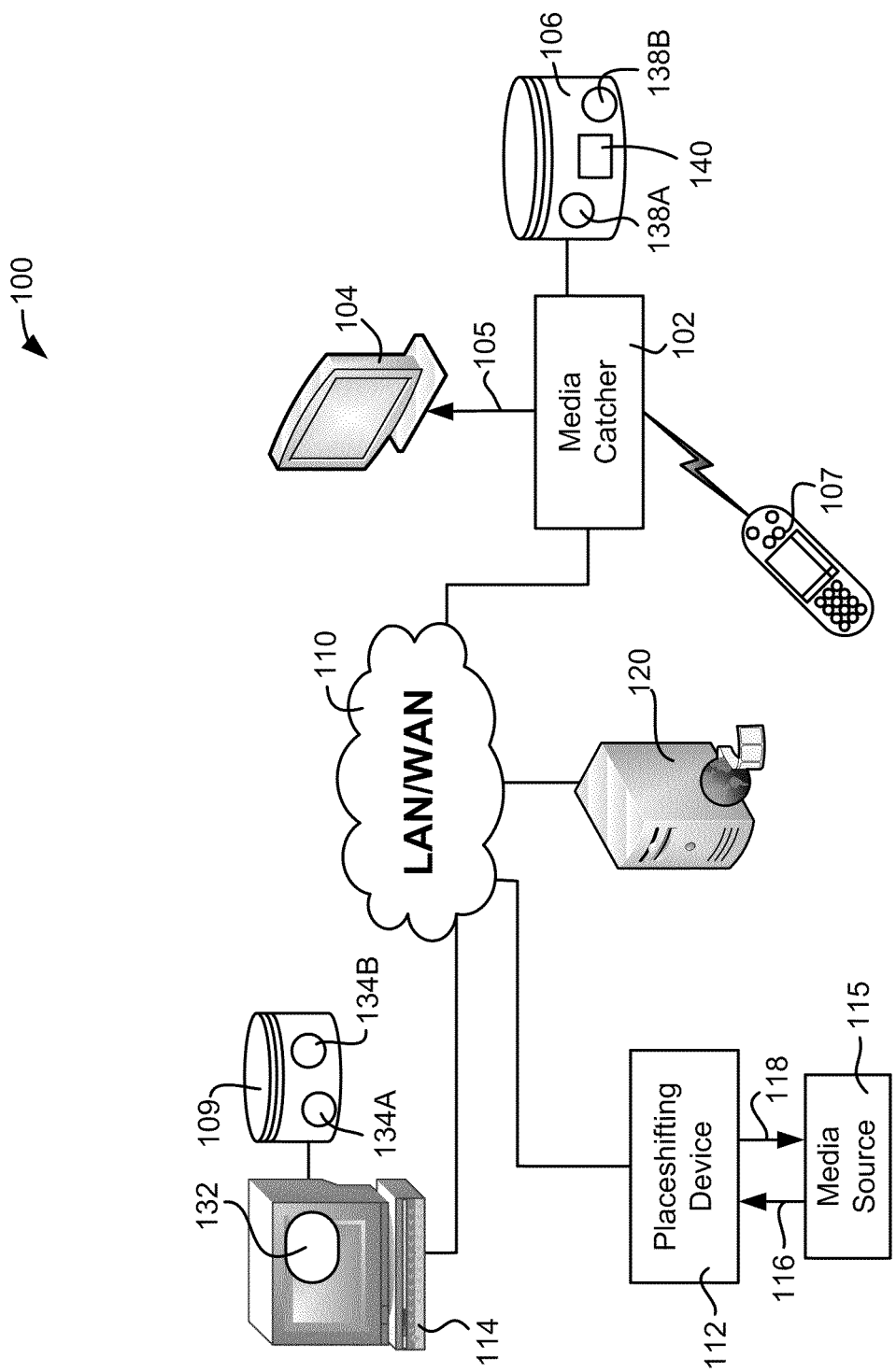

Turning now to the drawing figures and with initial reference to FIG. 1, an exemplary system 100 suitably includes a media catcher device 102 that communicates with a placeshifting device 112, a personal computer 114, and/or any number of content servers 120 via network 110. Additionally, media catcher 102 may receive content from a locally-connected storage device 106, as appropriate. Media content received from any of the various sources is suitably processed at media catcher 102 and presented on display 104 to create the desired user experience.

Media catcher device 102 is any device or component capable of receiving content from one or more sources and of processing the received content as appropriate to produce a desired experience for the user. Generally speaking, media catcher 102 is responsive to user commands received via a remote control 107 or other input device to obtain desired content from any number of content sources, and to format the obtained content for display to the user. Many different media-shifting scenarios could be formulated based upon available computing and communications resources. Various sources of media content available to media catcher 102 include placeshifting devices 112, network servers 120, portable media 106, and/or the like; each of these media sources is described below.

In various embodiments, media catcher 102 is able to obtain media content from one or more external storage devices 106, which may be any sort of disk drives, flash memory drives, network servers, virtual drives and/or the like. In such embodiments, users may store media files 138A-B on storage device 106 for playback on display 104. Such files may include video files, still imagery, audio files and/or any other type of media from any source. A user may keep a collection of home videos, for example, on a hard drive or other storage medium 106 that can be connected to or otherwise accessed by media catcher 102.

Storage media 106 is any media compatible with media catcher 102 that is capable of storing files 138A-B for playback to a television or other display 104. In various embodiments, media 106 includes any sort of hard drive (e.g., an optical or magnetic disk drive), memory drive (e.g., a flash memory stick or card), or other storage device that is compatible with both computer system 114 and media catcher 102. A conventional magnetic or flash drive having a universal serial bus (USB) interface, for example, could be compatible with both computer 114 and media catcher 102, although other formats and interfaces (e.g., IEEE 1394 "Firewire" or the like) could be used in any number of alternate embodiments. Media 106 may be formatted or logically organized in any manner to allow storage of files 138A-B in any convenient manner. In an exemplary embodiment, media 106 may be formatted in a file allocation table (FAT) compatible format, such as the so-called "FAT32" format, although any other formats could be used in other embodiments. FAT32, while highly compatible with any number of computing systems and components, is well-known to have difficulty in processing files larger than about four gigabytes in size due to design constraints. Because many conventional source files 134A-B may be larger than the size typically handled by a FAT32 or other format, it can be desirable to convert the source files 134A-B to a format that is more easily stored on the portable media 106.

Computer 114 suitably executes a file formatting and transfer program 132 that stores media files 138A-B on portable media 106. Computer 114 is any personal computer, workstation or the like that typically contains a processor, memory, input/output features, display, mass storage and/or other components typically associated with a conventional computer system. In various embodiments, media files 138A-B are stored in a format that is compatible with media catcher 102, which may involve translation from the original format of source files 134A-B. Such translation may be performed by program 132, for example, and may involve many features and/or steps. Source files 134 may be split into smaller file sizes, for example, and/or may be indexed or otherwise described in a metadata file 140 that directs playback of the media, as described more fully below. Program 132 may also transcode or convert files 134A-B to a different format that is more compatible with media catcher 102 in some embodiments. Program 132 may convert MPEG or QUICKTIME files to a WINDOWS MEDIA format, for example, in embodiments wherein media catcher 102 is best equipped for playback of WINDOWS MEDIA files; other formats (e.g., MPEG, H.264, AVC, Real Media and/or the like) may be additionally or alternately supported by program 132 and/or media catcher 102 as desired. In other embodiments, media catcher 102 may be limited to proprietary formats that may be written on media 106 by program 132, or media catcher 102 may support any number of different open or proprietary file formats.

Program 132 may also process any sort of digital rights management (DRM) features that may be associated with source files 134A-B and/or media files 138A-B, as desired. Program 132 may decode DRM restrictions or other features imposed on source files 134A-B, for example, and/or may impose DRM restrictions upon the created files 138A-B to restrict playback of such files. DRM features are optional, however, and need not be present in all embodiments.

In an exemplary embodiment, source files 134A-B are initially maintained on a disk, memory or other data repository 109 associated with a computer system 114. Repository 109 may be the same storage device as media 106 in some embodiments, or may be a separate storage device such as a separate hard drive, memory or the like. Source files 134A-B may be obtained from any source (e.g., directly from a camera, optical or magnetic disk drive, other recording or playback device, any network server 120, and/or any other source as appropriate), and may be stored on any temporary or permanent basis in repository 109 prior to storage on portable media 106. In various embodiments, however, direct storage in repository 109 may be bypassed in favor of storage to media 106 upon receipt or processing of a source file 134.

To view source files 134A-B on a television or other display 104, then, the user simply executes program 132 on computer system 114 to transfer the source data 134A-B to media 106 in an appropriate format. The portable media 106 may then be carried or otherwise transported to media catcher 102, which is then able to read, decode and present the information stored in files 138A-B. In various equivalent embodiments, media 106 may not be physically connected to computer 114, but may instead receive files 138A-B from program 132 via network 110 or the like.

Further, in some embodiments media 106 is a "virtual" drive that can be logically mounted or otherwise accessed by media player 102 via network 110 or the like, as described more fully below. To that end, network 110 is any digital or other communications network capable of transmitting messages between senders and receivers. In various embodiments, network 110 may represent a wide area network, a local area network, and/or any combination of wide and local area networks. In embodiments wherein media catcher 102 is located at a different building or other remote location from a desired content source, for example, network 110 can include any number of public or private data connections, links or networks supporting any number of communications protocols. Network 110 may include the Internet, for example, or any other network based upon TCP/IP or other conventional protocols. In many embodiments, system 100 is wholly or largely implemented within a relatively small geographical area (e.g., within a home or other structure). In such embodiments, network 110 may represent a conventional local area network, such as one or more IEEE 802.3 and/or IEEE 802.11 networks. Network 110 as shown in FIG. 1, then, is intended to broadly encompass any digital communications network(s), systems or architectures for transmitting data between the various components of system 100.

In addition to supporting file access from media 106, various embodiments of media catcher 102 may also directly support streaming media placeshifting over a digital network 110. In various embodiments, consumers may wish to placeshift content within a home, office or other structure, for example, such as from a placeshifting device 112 to media catcher 102 located in another room. In such embodiments, the content stream will typically be provided over a wired and/or wireless local area network operating within the structure. In other embodiments, consumers may wish to placeshift content over a broadband or similar network connection from a primary location to a media catcher device 102 located in a second home, office, hotel or other remote location.

In various embodiments, media catcher 102 receives a media stream over network 110 from one or more placeshifting devices 112. In this case, placeshifting device 112 packetizes media content 116 received from a media source 115 for transmission over communications network 110. To that end, placeshifting device 112 is any component, hardware, software logic and/or the like capable of transmitting a packetized stream of media content over network 110. Although FIG. 1 shows only a single placeshifting device 112, in practice system 100 may include any number of placeshifting devices 112 and/or media sources 115, each of which may be able to stream media content to media catcher 102. Each placeshifting device 112 therefore incorporates suitable transcoder logic to convert audio/video or other media data 116 into a packetized format (e.g., MPEG, QuickTime, Windows Media and/or the like) that can be transmitted over network 110. The media data 116 may be in any format, and may be received from any source 115 such as any digital or analog recording device (e.g., a digital video recorder); any broadcast, cable or satellite television programming source; any "video-on-demand" or similar source; a player for any sort of digital video disk (DVD) or other removable media; a security or other video camera; and/or the like. Placeshifting device 112 may also provide control instructions to one or more media sources 115 using any sort of infrared, radio frequency, or other signals 118. Such signals 118 may be provided, for example, from an "IR Blaster" or similar feature that emulates infrared or other RF instructions provided from a remote control associated with the media source 115. U.S. Patent Publication No. 2006/0095471 describes one example of a placeshifting encoder, although the concepts described herein could be used in conjunction with products and services available from any source, including those available from Sling Media of Foster City, Calif. and others.

System 100 may also include any number of servers 120 that are each capable of providing media content to media catcher 102, or of directing media catcher 102 toward media content stored in another location, as appropriate. In various embodiments, server 120 is a conventional Internet server that interacts with a browser or viewer application executing on media catcher 102 to provide images, audio, video and/or other content as desired. In further embodiments, server 120 is a web server that includes links to other content servers available to the media catcher 102. In such embodiments, a user may direct the media catcher 102 to initially contact server 120, and subsequently direct media catcher 102 to follow hypertext markup language (HTML) or other links provided by server 120. Content from one or more servers 120 may be stored on media 106, for example, to allow buffering and/or playback at a later time. Such content may, in some embodiments, be stored as files 138A-B using the techniques described herein. Many different interface options are available across a wide array of equivalent implementations to allow media catcher to obtain media content from any number of servers 120.

In various embodiments, media catcher 102 may also be able to receive streaming content from other sources via network 110. A conventional computer system (e.g., computer 114), for example, could execute software that provides a video stream to media catcher 102 over network 110. The video stream may be, for example, a Windows Media, QuickTime and/or MPEG stream, although other formats could be equivalently used. In various embodiments, computer 114 executes a software program that encodes and transmits a portion of a screen display viewable on a monitor associated with computer 114. Such embodiments may, for example, encode a portion of a screen display bitmap into a streaming format that can be transmitted on the media. In such embodiments, a media file or clip that would ordinarily be viewed on the computer display can be simultaneously (or alternately) transmitted to media catcher 102 for presentation on display 104. In other embodiments, computer 114 transmits media data in any sort of streaming, file-based, batch or other format to media catcher 102 for display as desired. While computer 114 has been described herein as executing program 132 for formatting media files 138A-B on media 106 and also providing placeshifting features, in practice these features could be provided by different computer systems, or placeshifting could be removed entirely from system 100.

In operation, then, media catcher 102 is able to obtain media content from one or more sources, to process the received content for playback, and to provide suitable output signals 105 for presenting the media content on display 104. In one embodiment, media catcher 102 is able to receive encoded media streams from placeshifting device 112 and/or computer 114, and is additionally able to receive streaming and/or file-based content from server 120 and/or local storage 106. This content can be received in any of various formats for decoding and presentation on display 104. In various embodiments, media catcher 102 provides video output signals 105 to display 104 in any compatible format. In embodiments wherein display 104 is a conventional television, for example, media catcher device 102 may provide video output signals 105 in any conventional format, such as component video, S-video, High-Definition Multimedia Interface (HDMI), Digital Visual Interface (DVI), IEEE 1394, and/or any other formats as desired. By designing media catcher 102 to support multiple formats and multiple sources of media content, the user may be further able to conveniently enjoy content from multiple sources on a common display 104, although other embodiments may support any number of media formats and/or sources, including a single source (e.g., portable media 106) having files in a single format.

Figure 2:
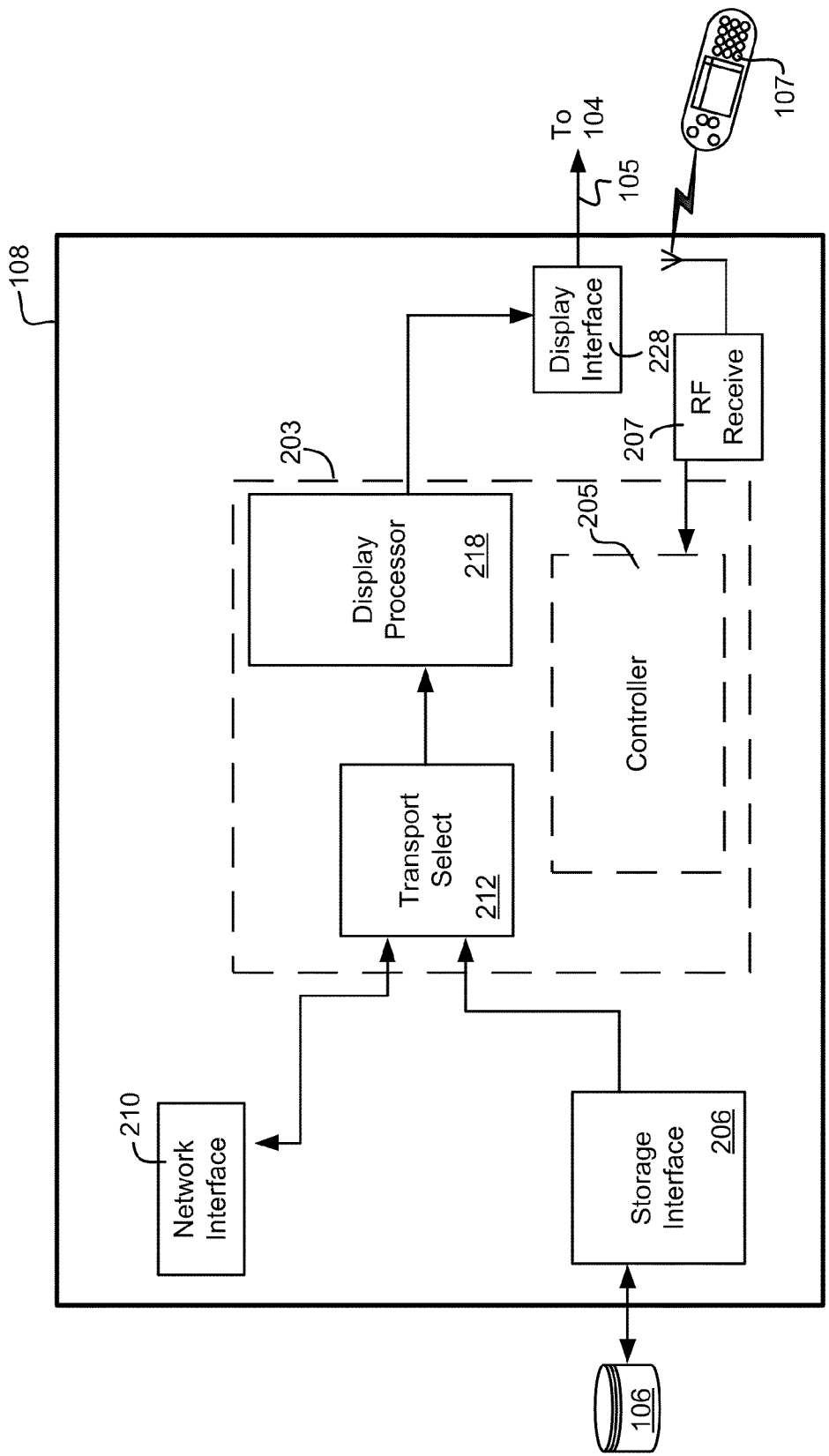
FIG. 2 is a block diagram of an exemplary media catcher system.

FIG. 2 provides additional detail about an exemplary media catcher device 102 that includes a network interface 210, a storage interface 206, and a display interface 228 as appropriate. FIG. 2 also shows a transport select module 212, display processor module 218 and control module 205 executing on a common processor 203. Alternatively, transport select module 212 may be implemented on a separate chip (e.g., an audio/video decoder) with subsequent processing managed on a digital signal processor, network processor, video decoder and/or other processing circuitry as desired. Other embodiments may incorporate additional or alternate processing modules from those shown in FIG. 2, and/or may omit one or more modules shown in FIG. 2, and/or may organize the various modules in any other manner different from the exemplary arrangement shown in FIG. 2.

Media catcher device 102 may be logically and physically implemented in any manner. FIG. 2 shows various logical and functional features that may be present in an exemplary device 102; each module shown in the figure may be implemented with any sort of hardware, software, firmware and/or the like. Any of the various modules may be implemented with any sort of general or special purpose integrated circuitry, for example, such as any sort of microprocessor, microcontroller, digital signal processor, programmed array and/or the like. In various embodiments, any number of the modules shown in FIG. 2 may be implemented as part of a "system on a chip" (SoC) using any suitable processing circuitry under control of any appropriate control logic 205. In such embodiments, control logic 205 executes within an integrated SoC or other processor that also implements transport selector 212 and display processor 218, as well as any logic that controls network interface 210 and/or storage interface 206, as appropriate. NXP Semiconductors of Eindhoven, Netherlands, for example, produces several models of processors that are capable of supporting SoC implementations, although products from any number of other suppliers could be equivalently used. In still other embodiments, various distinct chips, circuits or components may be inter-connected with each other to implement the functions represented in FIG. 2.

Various embodiments of control logic 205 can include any circuitry, components, hardware, software and/or firmware logic capable of controlling the components and processes operating within device 102. Although FIG. 2 shows control logic 205 as a discrete feature, in practice control logic 205 will typically interact with each of the other modules and components operating within media catcher 102 to direct the operation thereof.

Media catcher 102 includes an appropriate network interface 210 that operates using any implementation of protocols or other features to support communication by device 102 on network 110. In various embodiments, network interface 210 supports conventional LAN, WAN or other protocols (e.g., the TCP/IP or UDP/IP suite of protocols widely used on the Internet) to allow device 102 to communicate on network 110 as desired. Network interface 210 typically interfaces with network 110 using any sort of LAN adapter hardware, such as a conventional network interface card (NIC) or the like provided within device 102.

Storage interface 206 is any physical, logical and/or other features that can be used to interface with an external storage medium 106 such as a magnetic or optical disk drive, a flash memory card, and/or any other sort of storage as appropriate.

In various embodiments, storage interface 206 is a universal serial bus (USB) or other standard interface that allows users to store files at a conventional computer system (e.g., computer 114 in some embodiments) for playback via media catcher 102. In such embodiments, media catcher 102 will typically include a physical interface that can receive the media 106, as well as a logical interface that may be implemented within the SoC or other logical features of device 102 to execute in response to control logic 205. As noted above, storage interface 206 may be compatible with any open or proprietary format, such as the FAT32 format.

In various embodiments, media 106 need not be physically present at media catcher 102, but rather may be logically mounted as a remote drive or the like. In such embodiments, storage interface 206 may actually be a logical interface to a remote volume (or partition or other portion of a remote volume) that is mounted using any sort of network file system (NFS) or other distributed file system technique via network 110.

In many embodiments, media catcher 102 includes an input interface 207 that receives infrared or other wireless instructions from remote control 107. Input interface 207 may also include any number of buttons, sliders, knobs or other physical input devices located on a housing of device 102. In operation, user instructions provided by remote control 107 and/or any other input features are received at input interface 207 for subsequent processing by control logic 205. In various embodiments, control logic 205 takes appropriate actions based upon the particular inputs received; examples of appropriate actions may include directing display processor 218 to generate or modify the presented imagery, directing a command packet to be sent to a remotely-located content source, and/or any other actions.

Transport stream select module 212 is any hardware and/or software logic capable of selecting a desired media stream from the available sources. In the embodiment shown in FIG. 2, transport select module 212 is able to select video signals for presentation on one or more output interfaces 228. Stream select module 212 therefore responds to viewer inputs (e.g., via control logic 205) to simply switch content received from a network source 210 or from storage 106 to one or more display processing modules 218.

Display processor module 218 includes any appropriate hardware, software and/or other logic to create desired screen displays at interface 228 as desired. In various embodiments, display processor module 218 is able to decode and/or transcode the received media to a format that can be presented at display interface 228. The generated displays, including received/stored content and any other displays may then be presented to one or more output interfaces 228 in any desired format. In various embodiments, display processor 218 produces an output signal encoded in any standard format (e.g., ITU656 format for standard definition television signals or any format for high definition television signals) that can be readily converted to standard and/or high definition television signals at interface 228.

Display processing module 218 is also able to produce on screen displays (OSDs) for electronic program guide, setup and control, input/output facilitation and/or other features that may vary from embodiment to embodiment. Such displays are not typically contained within the received or stored broadcast stream, but are nevertheless useful to users in interacting with device 102 or the like. In particular, on-screen displays can be used to generate user interfaces that allow convenient program selection, control and the like, as described more fully below.

In operation, then, the user selects desired media content from a network source (e.g., placeshifting device 112, computer 114, server 120 in FIG. 1), and provides appropriate inputs via remote control 107 or the like. The commands are received at input interface 207 and provided to control logic 205, as appropriate. Control logic 205 is then able to contact the appropriate content source via network interface 210, storage interface 206, and/or the like, and to select the desired content using, for example, transport select module 212. The obtained content can then be rendered and/or otherwise processed by display processor 218 and received at display interface 228 in an appropriate format so that output signals 105 can be provided to the external display 104.

Additionally, in various embodiments, media catcher 102 may also be able to transmit control information to a remotely-located media source via network 110. As user instructions are received from remote control 107, for example, control logic 205 or another feature within media catcher 102 may formulate a command request message that is transmitted over network 110 for executing at the remote media source 115 to change the media stream provided by that remote media source 115.

Figure 3:
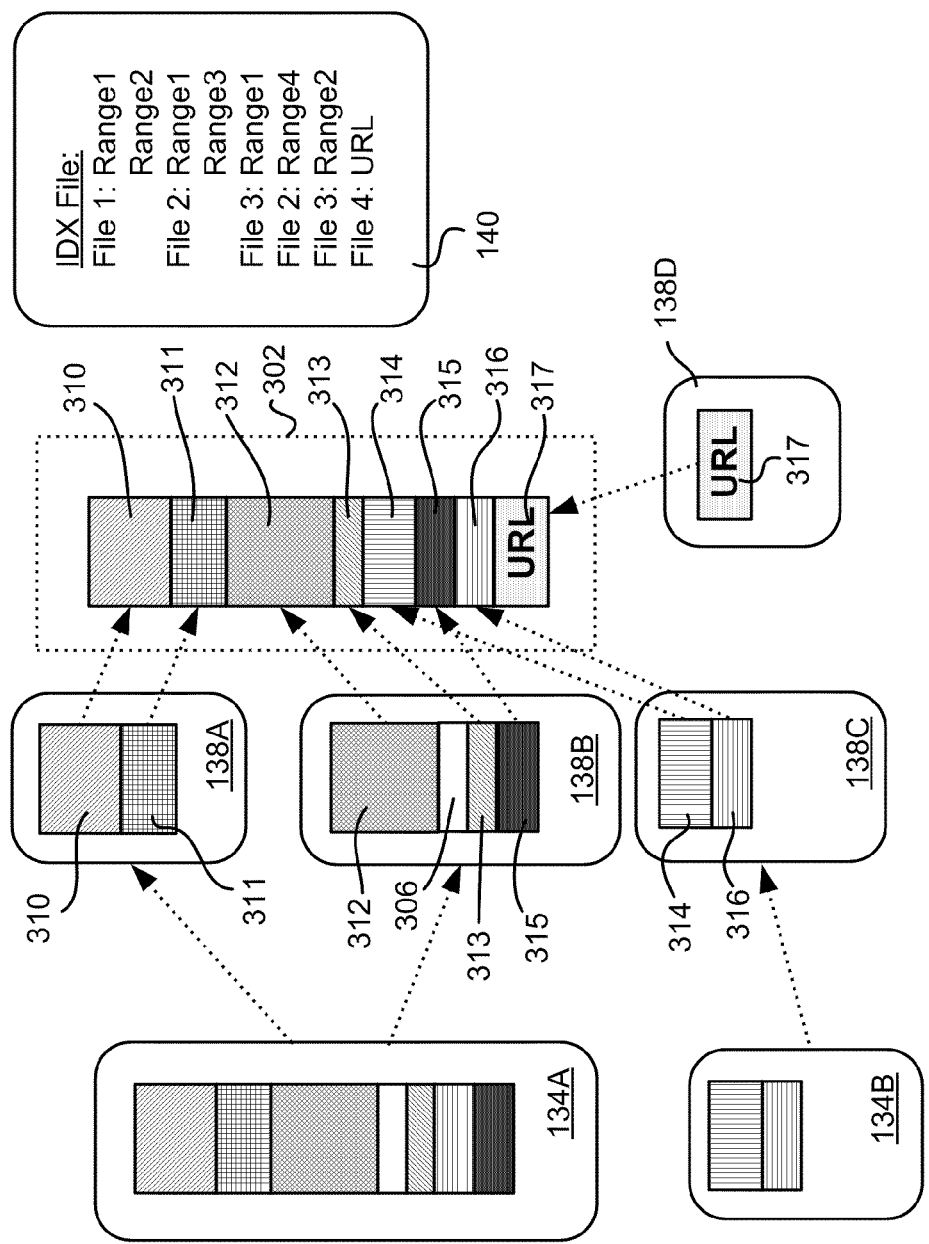
FIG. 3 is a block diagram of an exemplary media stream.

FIG. 3 shows an exemplary logical diagram for implementing one type of logical media stream 302 that can be stored on media 106 for playback on media catcher 102. In various embodiments, the various features and components of logical media stream 302 are created and stored on media 106 by program 132 executing on any sort of computer system 114, as described above.

Logical media stream 302 is any logical arrangement of data that is capable of being decoded on media catcher 102 for playback on display 104. Generally speaking, media stream 302 is described by metadata 140, which includes sufficient information to identify the various components of stream 302 and the order in which the various components are presented. In various embodiments, logical media stream 302 is made up of various blocks 310-317 that can be stored within one or more data files 138A-D. Each data file 138A-D, in turn, is created from one or more source files 134.

Even if the source file 134 is larger than the designated block size suitable for media 106, the resulting files 138A-D and/or block(s) 310-317 that are created from the source file 134 may be differently-sized to fit within the constraints of the particular file system for media 106. If media 106 is formatted as a FAT32 volume, for example, files 138A-D may be sized to be smaller than the four gigabyte maximum imposed by that format. In this example, files 138A-D may be designed to be no larger than, say, one gigabyte or so to ensure compatibility with the particular file format. Other embodiments may be based upon other disk formats, and may have different file sizes as desired; that is, the formatting module can be designed to support block sizes that are compatible with any sort of target file system, including any file system based upon any sort of FAT (e.g., FAT12, FAT16, FAT32, etc.), hierarchical file system (e.g., HFS, HFS+), network file system (e.g., NFS), high performance file system (e.g., HPFS) and/or other file system (e.g., NTFS, ext2, ext3, ISO 9660, ODS-5, UDF) as appropriate.

In various embodiments, media files 138 stored on medium 106 may be further logically divided into ranges or other "blocks" 310-317 that can be individually assembled to create media stream 302. In various embodiments, each "block" 310-317 represents some or all of a media file 138 stored on medium 106. Blocks, in various embodiments, may simply represent ranges of disk sectors or other addresses within files 138A-D that can be recognized from pointers, ranges, offsets or other logical indicators that may be stored in metadata 140, for example.

By referencing portions of media stream 302 based upon blocks 310-317 rather than files 138A-D, additional flexibility can be provided since sections of files 138A-D can be skipped or mixed in different sequential orders in constructing media stream 302. It may be desirable to skip over non-media content contained within a particular file 138, for example, or to create various streams 302 that make use of overlapping yet distinct content from different files. In the example shown in FIG. 3, for example, block 306 in file 138B is not used within stream 302. This may be because block 306 contains non-media content, for example. Alternately, block 306 may contain content that is edited from the particular stream 302 (e.g., because it contains adult content, or for any other reason) but may be included within other streams as desired. The example of FIG. 3 also shows blocks from various files 138A-D being arranged in alternating order, e.g., with block 315 from file 138B being presented in stream 302 between blocks 314 and 316 from file 138C in this example. This may be useful, for example, in inserting commercial content from file 138C into a media stream primarily based upon source file 134A. Also note that some files (e.g, file 138D) and blocks (e.g., block 317) may coincide. Stated another way, some files 138 may have but a single block.

Each source file 134A-B, then, can produce one or more media files 138A-D, and each media file 138A-D may by represented as one or more blocks (e.g., blocks 310-317) that make up the media stream 302. Each file 138A-D may be formatted by program 132 from any source file 134, as desired; resizing may take place before, after, or concurrently with any other format conversion, DRM processing or other processing provided by program 132. Program 132 therefore stores any number of files 138A-D on media 106 in any sort of format or order; the various blocks 310-317 making up the various files 138A-D can be later retrieved to reconstruct the media stream 302 that is represented by the original source file(s) 134.

Media stream 302 may be described by any sort of metadata 140 as appropriate. In various embodiments, metadata 140 is stored as a file on media 106 that contains offsets, ranges or other descriptions of the various blocks 310-317 making up media stream 302, as well as the order of the various blocks 310-317. In the exemplary stream 302 shown in FIG. 3, for example, metadata 140 describes the ranges of blocks 310-316 in files 138A-D in the order used to make up the media stream. Metadata describing each block 310-316 may be in the form of an offset from a base address (e.g., an address indicating the beginning of file 138A-D or any other point of reference), a range of addresses/sectors/blocks, or the like. This metadata arrangement provides the ability to store a relatively large media file within the size constraints of FAT32 or similar filing systems.

Moreover, additional features can be enabled in various embodiments. Certain data contained in the original source file 136 or the media file 138 may be omitted from the media stream 302, for example. This can be useful skipping over navigation data or other information that is not supported by the playback engine in media catcher 102, for example. While this information may be included in files 138A-D for compatibility or completeness, it can be readily excluded from playback by simply excluding the range of the relevant data from the metadata describing the playback stream 302. In the exemplary embodiment shown in FIG. 3, for example, block 306 in file 138B is omitted from media stream 302. In various embodiments, another media stream 302 could be described by a separate index file or other collection of metadata 140 that would include omitted blocks (such as block 306 in FIG. 3). This feature may be useful in creating customized versions of programs that omit certain scenes (e.g., adult content).

In other embodiments, additional content not present in the original source file 136 may be inserted into the media stream 302. Block 317 in the example of FIG. 3, for example, may represent an advertisement or other feature that may not be present in the initial source file 136. Such information may be inserted into the media stream 317 by media catcher 102 and/or by program 132 as appropriate.

Note that content in media stream 302 need not be physically stored on media 106, but may be alternately stored elsewhere within media catcher 102, retrieved from any source on network 110, or provided from any other source as desired. For example, metadata 140 and/or any particular block (e.g., block 317) or file (e.g., file 138D) may provide a uniform resource locator (URL) or other identifier that identifies a location of certain content on network 110 or elsewhere. In such embodiments, media catcher 102 may process the URL to obtain the content to be included, thereby conserving storage space on media 106 and allowing for flexibility in inserting different content (e.g., advertisements) that could be rotated or altered during subsequent viewings of media stream 302.

Further, the metadata 140 can allow for progressive playback of media stream 302 as desired. That is, one or more portions of media stream 302 may be played back while other portions are being loaded from media 106, retrieved via network 110, and/or otherwise obtained as desired.

In operation, then, various blocks of data 310-317 are stored in one or more files 138A-D on media 106 or elsewhere. Logical media stream 302 is described by metadata 140, which contains references to blocks 310-317 and/or files 138A-D as appropriate.

Figure 4:
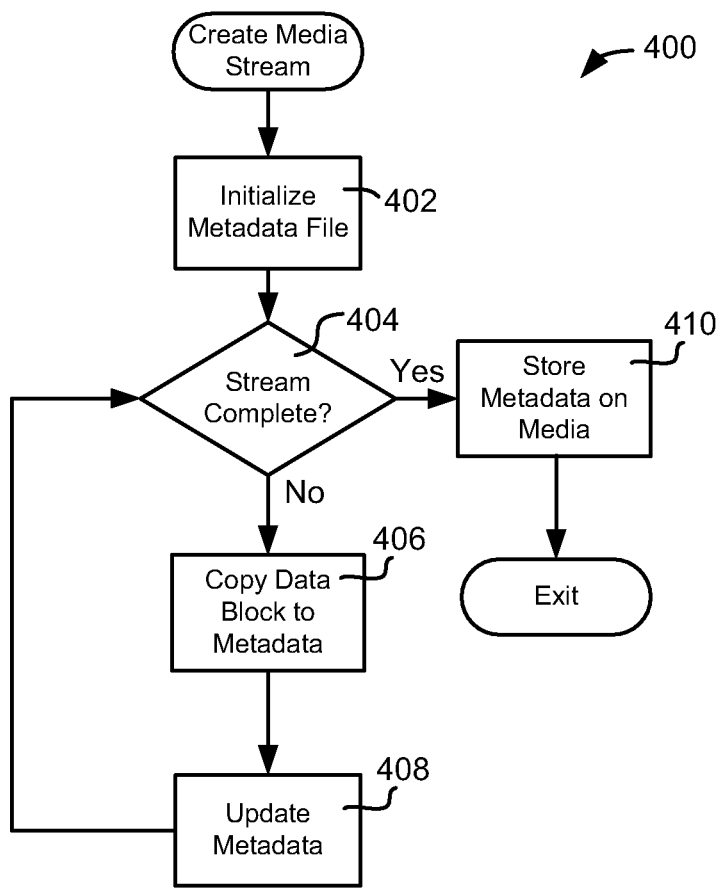
FIG. 4 is a flowchart of an exemplary process for creating a video stream.
Figure 5:
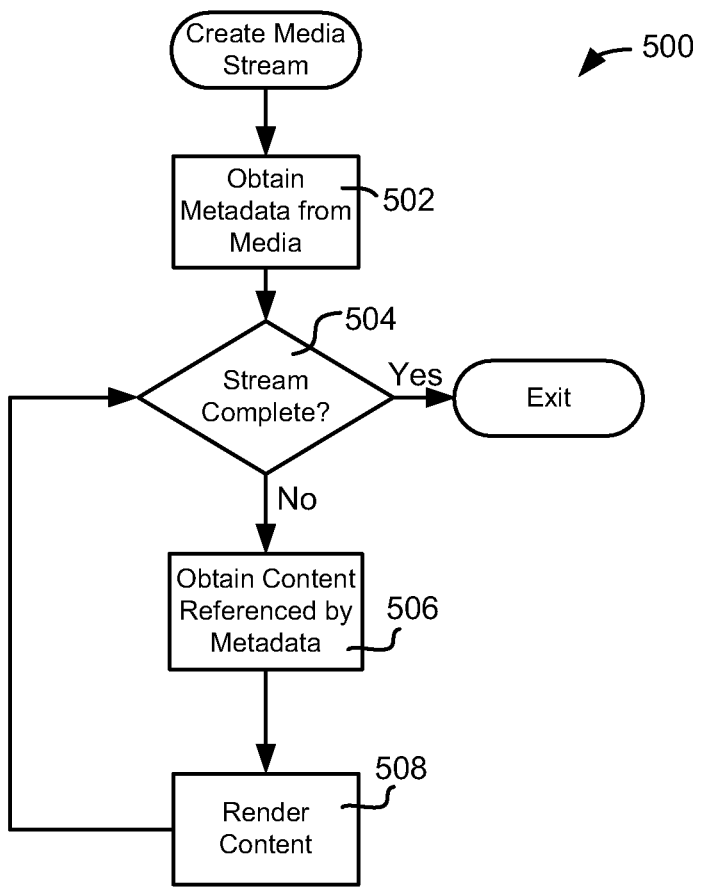
FIG. 5 is a flowchart of an exemplary process for playing back a video stream.

FIGS. 4 and 5 show exemplary methods 400 and 500 for creating and playing back a logical media stream 302, respectively. Generally speaking, each of the method steps shown in FIGS. 4 and 5 may be implemented in software or firmware that may be stored in memory, mass storage or any other storage medium available to the executing device, and that may be executed on any processor or control circuitry associated with the executing device. Method 400, for example, may be executed as part or all of program 132 (FIG. 1) executing on computer 114, for example, whereas method 500 may be executed as part of control logic 205 in media catcher 102 (FIG. 2), acting alone or in conjunction with storage interface module 206 and/or display processor 218 as appropriate. Other components, systems, logic or devices may be involved in various other embodiments as appropriate.

Referring to FIG. 4, an exemplary process 400 for creating a media stream 302 suitably includes the broad steps of initializing the index file or other metadata 140 (step 402), copying data files 138 to the media 106 (step 406), and updating the metadata 140 describing the stream 302 until the stream is complete. The complete metadata 140 describing the stream 302 may then be written to media 106.

Metadata 140 and/or media 106 may be initialized in any manner (step 402). In various embodiments, media 106 is initially formatted in an appropriate format (e.g., FAT32 or any other file system as desired) so that the media is ready for storing files 138 that can be read by media catcher 102. Such formatting need not take place upon each iteration of method 400, however, and may only be needed when the media 106 is initially purchased or used. Initializing metadata 140 may simply involve creating a new file in any format that can be read by media catcher 102 and opening the file for write access to receive metadata as appropriate.

Data is transferred to media 106 in any manner (step 406). In various embodiments, data from a source file 136 is loaded into memory, formatted as desired (including any transcoding, DRM processing and/or the like), and then written to media 106 as one or more files 138 as described above. Each file 138 is typically sized to reside within any storage or size constraints imposed by the file system. As files are copied to media 106, then, the metadata 140 is updated to reflect the addition of the block and/or file (step 408). As noted above, blocks 310-317 need not be arranged sequentially in any particular stream 302, and multiple streams 302 may be provided for any set of files 138 and/or blocks 310-317 as desired. Further, multiple distinct streams 302 may be stored on any particular media 106.

Updating of metadata 140 may be performed in any manner. In various embodiments, metadata 140 simply includes a listing of blocks 310-317 and/or files 138 that contain content making up media stream 302. Blocks 310-317 may be referenced in any manner. In an exemplary embodiment, each block 310-317 is identified by an offset, pointer or other value that can be determined from, for example, a base or initial address of the file 138 that encompasses the particular block. In other embodiments, address ranges for one or more blocks 310-317 may be provided. Entries for multiple blocks 310-317 found within a particular file 138 may be combined in any manner.

Copying and updating continues and repeats as appropriate until the stream 302 is complete (step 404). When the data is appropriately formatted and stored on media 106, the metadata 140 describing the one or more media streams 302 is written to the media 106 (step 410) as appropriate.

FIG. 5 shows an exemplary method 500 for media playback that includes the broad steps of obtaining the metadata 140 from media 106 and then using the metadata 140 to identify content for retrieval (step 506) and rendering (step 508). In many embodiments, media catcher 102 will include a media playback system (e.g., incorporated within display processor module 218 in FIG. 2) with both a media source component 506 and a rendering engine 508. Generally speaking, the media source component 506 retrieves metadata 140 and any data blocks 138 from media 106 or elsewhere. The media source component also typically formats media stream 302 as described in index file 140 for presentation to rendering engine 508. Rendering engine 508 that uses an appropriate decoder to decode the formatted stream 302 for presentation to the viewer.

To present a media stream 302 to the viewer, then, media catcher 102 initially obtains the metadata 140 and associated content blocks 138 that make up the stream 302 from media 106 as appropriate (step 502). As noted above, media 106 need not be physically present at media catcher 102 in all embodiments. To the contrary, media 106 may be a virtual or network volume that is accessible over a network 110 or the like.

After retrieving metadata 140 (step 502), media content may retrieved from media 106 in any manner (step 506). In the embodiment shown in FIG. 5, content is shown as being retrieved and rendered (step 508) on an ongoing basis, such that rendering may occur at the same time that subsequent content (e.g., a subsequent block 310-317) is being retrieved. This process may continue until all of the blocks 310-317 have been retrieved and/or rendered, as appropriate (step 504). In other embodiments, however, multiple blocks (e.g., the entire stream 302, or any portion thereof) may be initially retrieved prior to rendering so that reading to media 106 is not needed during rendering step 508. The various steps shown in FIGS. 4 and 5 may therefore be altered or differently arranged in any manner to allow for any number of practical implementations.

As used herein, the word "exemplary" means "serving as an example, instance, or illustration." Any implementation described herein as exemplary is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. Various changes may be made in the function and arrangement of elements described without departing from the scope of the invention.

What is claimed is:

1. A method for storing a media stream on a storage medium, wherein the media stream is based upon a plurality of source files, the method comprising:
    creating, by a processor, an index file for the media stream, wherein the index file indicates a playback order for the media stream;
    processing, by the processor, a metadata file associated with each of the plurality of source files to identify at least one data block within each of the plurality of source files and to identify a type of content associated within each of the at least on data blocks;
    processing, by the processor, each of plurality of source files to create a plurality of media files based upon the identified blocks of data, each of the plurality of media files comprising a plurality of portions having a unique content;
    storing, by the processor, the plurality of media files on the storage medium;
    updating, by the processor, the index file to reference at least one of the plurality of portions of each of the plurality of media files in each of the plurality of source files, wherein the processor automatically modifies the playback order of the media stream to skip at least one of the plurality of portions in one of the plurality of media files based upon the identified type of content of the at least one portion of the media file; and
    storing, by the processor, the index file on the storage medium,
    wherein at least one of the plurality of source files is a commercial and the updating further comprises updating the index file to insert the commercial into the playback order.

2. The method of claim 1 wherein the storage medium comprises an associated file system, and wherein the processing comprises dividing the at least one source file into a plurality of media files each having a size that is less than a maximum file size associated with the associated file system.

3. The system of claim 2 wherein the associated file system is a FAT32 file system.

4. The method of claim 1 wherein the processing comprises dividing the at least one source file into a plurality of media files.

5. The method of claim 4 wherein each of the media files are smaller than a maximum file size associated with the storage medium.

6. The method of claim 5 wherein the at least one source file is larger than the maximum file size associated with the storage medium.

7. The method of claim 1 wherein the processing further comprises transcoding the at least one source file to create the at least one media file in a different format than the at least one source file.

8. The method of claim 1 wherein the processing further comprises decoding digital rights management restrictions on the at least one source file.

9. The method of claim 1 wherein the processing further comprises encoding digital rights management restrictions on the at least one media file.

10. The method of claim 1 wherein the updating comprises referencing the portion of the at least one media file, wherein the referenced portion is less than the entirety of the at least one media file.

11. A method for playing a media stream stored on a storage medium for a viewer, the method comprising:
    obtaining a metadata file describing the media stream from the storage media, wherein the media steam includes a plurality of media files from each of a plurality of different source files and an order of presentation of the media files is non-sequential, the metadata file describing a type of content associated with each of the plurality of media files;
    processing the order of presentation to skip at least a portion of one of the plurality of media files based upon the type of content associated with the portion of the one of the plurality of media files and further processing the order of presentation to insert at least one media file, wherein the at least one media file inserted into the order of presentation includes a commercial;
    processing each of the plurality of different source files referenced by the metadata file from the storage media to obtain the plurality of media files from each of the plurality of different source files, wherein the each of the media files contains at least a portion of the media stream; and
    rendering at least a portion of each media file to thereby present the media stream for the viewer based upon the processed order of presentation.

12. The method of claim 11 further comprising repeating the processing and rendering steps for a plurality of media files referenced by the metadata and stored on the storage medium.

13. The method of claim 11 wherein the at least a portion of the at least one media file comprises an advertisement referenced by the metadata file.

14. The method of claim 11 wherein the metadata file comprises references to a plurality of blocks, each block corresponding to a portion of the at least one media file stored on the storage media.

15. The method of claim 14 wherein the rendering comprises sequentially rendering each of the plurality of blocks referenced in the metadata file.

16. The method of claim 11 wherein the metadata file comprises a reference to at least one media file that is remotely located over a digital network.

17. A system for presenting a media stream stored on a storage medium to a viewer on a display, the system comprising:
    a first interface to the storage medium;
    a second interface to the display; and
    a processor configured to obtain a metadata file from the storage medium, wherein the metadata file includes data for a media steam including a plurality media files from each of a plurality of different source files, the metadata file indicating a type of content associated with each of the plurality of media files, the processor further configured to create a non-sequential order of presentation of the media files, the non-sequential order of presentation skips at least a portion of one of the plurality of media files based upon the type of content associated with the portion of the one of the plurality of media files and inserts at least one commercial into the non-sequential order of presentation, to process each of the plurality of different source files to retrieve the plurality of media files from each of the plurality of different source files identified by the metadata file from the storage medium, and to render each of the plurality of media files according to the order or presentation to thereby present the media stream to the viewer on the display.

18. The system of claim 17 further comprising a third interface to a digital network.

19. The system of claim 18 wherein at least a portion of the media stream is retrieved from a location on the digital network that is identified in the metadata file.

20. The system of claim 18 wherein the processor is further configured to process references in the metadata file to a plurality of blocks, each block corresponding to a portion of the plurality of media files stored on the storage media.

* * * * *